Patented July 31, 1928.

1,678,987

UNITED STATES PATENT OFFICE.

JAMES DOUGLAS MacMAHON, OF NIAGARA FALLS, NEW YORK, ASSIGNOR TO THE MATHIESON ALKALI WORKS, OF NEW YORK, N. Y., A CORPORATION OF VIRGINIA.

HYPOCHLORITE COMPOSITION.

No Drawing. Application filed May 20, 1927. Serial No. 193,065.

This invention relates to improvements in hypochlorite compositions. The invention provides a composition of improved stability adapted to give, on solution in water, solutions of sodium hypochlorite which has several important advantages.

Calcium hypochlorite is not entirely satisfactory as a bleaching or disinfecting agent in the presence of soap solutions because of the tendency toward precipitation of calcium soaps. This is a serious disadvantage in many instances, for example in the case of laundries.

To overcome such difficulties, it has hitherto been proposed to employ sodium hypochlorite instead of calcium hypochlorite. For example, solutions of ordinary bleaching powder (containing say 35% of available chlorine) have been treated with sufficient soda ash to precipitate the calcium present as calcium carbonate to form a solution containing sodium hypochlorite and sodium chloride. It has also been proposed to mix soda ash with bleaching powder to form a mixture which will yield a solution of sodium hypochlorite on addition to water, but mixtures of this type have proven to be unstable.

United States Letters Patent No. 1,481,003 also describes the use of mixtures of sodium carbonate with calcium hypochlorite of high purity and stability. Such compositions yield solutions containing sodium hypochlorite when dissolved in water and are of improved stability, particularly as compared to similar mixtures in which ordinary bleaching powder is employed.

I have now found, however, that anhydrous sodium sulphate has several important advantages when used in admixture with calcium hypochlorite or bleaching powder to form compositions adapted to yield solutions of sodium hypochlorite when dissolved in water.

The improved composition of the present invention is made up of a substantially dry mixture of anhydrous sodium sulphate and a calcium compound of hypochlorous acid, such as bleaching powder or calcium hydrochlorite. The amount of anhydrous sodium sulphate is advantageously somewhat in excess of that necessary to react with all of the calcium present; this excess may amount for example to about 5% or 10%.

Anhydrous sodium sulphate apparently does not increase the instability of ordinary bleaching powder when mixed with it, so that in this respect the invention makes it possible satisfactorily to employ compositions containing ordinary bleaching powder without difficulties due to decomposition, particularly as compared with ordinary bleaching powder.

Anhydrous sodium sulphate is also used with advantage, in accordance with the present invention, in connection with calcium hypochlorite products relatively free from calcium chloride. For example, calcium hypochlorite products, including basic calcium hypochlorite products, such as those described in United States Letters Patents Nos. 1,481,039 and 1,481,040 or in applications Serial Nos. 746,667, 51,863, 51,864, 58,118 and Nos. 127,168 to 127,176 inclusive may be used with advantage in the improved compositions of this invention.

When such mixtures of anhydrous sodium sulphate and a calcium compound of hypochlorous acid are dissolved in water, a solution of sodium hypochlorite containing calcium sulphate in suspension is formed. The insoluble calcium sulphate may be readily separated by settling followed by decantation of the clear solution, or it may be removed by filtration.

The following example will serve further to illustrate the invention: 1.000 part by weight of a calcium hypochlorite product analyzing 75.0% calcium hypochlorite, 1.5% calcium chlorate, 7.0% calcium hydroxide, 3.0% calcium carbonate, 0.5% calcium chloride and 12.0% sodium chloride is intimately mixed with 0.921 part by weight of anhydrous sodium sulphate analyzing 99.8% sodium sulphate and about 0.07% water. This mixture remains a mechanical mixture until it is dissolved in water, when it forms a solution of sodium hypochlorite containing calcium sulphate in suspension.

Reference herein to anhydrous sodium sulphate is intended to mean sodium sulphate substantially free from water including water of crystallization, that is to $Na_2SO_4$.

If free lime is present in the calcium compound of hypochlorous acid, an equivalent amount of sodium hydroxide will be formed when the mixture is dissolved. If this is objectionable, acids or acid salts, such as boric acid or sodium bicarbonate, may be added to control alkalinity due to this cause. The amount of such acid or acid salt, for example, may be regulater to render the resulting solution neutral or acid or of reduced alkalinity. In general, some alkalinity assists in improving the stability of the solution.

The new composition of the invention is of general use in the production of solutions of sodium hypochlorite, and enables the production of solutions of any usual strength. The improved composition of the invention can thus be used in making solutions for purposes of disinfection in dairies and in households, for use in laundries and for textile bleaching, etc.

The new composition of the present invention is of improved stability, particularly with respect to elevated temperatures. It is thus of special utility for use under conditions such that the mixture is subjected to elevated temperatures, particularly for prolonged periods, before being dissolved in water to form a sodium hypochlorite solution. When dissolved in water, the new composition of the invention also produces a solution from which the suspended insoluble matter settles comparatively quickly and completely. This property of the mixture is advantageous, particularly where clear solutions of sodium hypochlorite free from suspended insoluble matter are required and where filtration is inconvenient or undesirable.

I claim:

1. A composition comprising a substantially dry mixture containing anhydrous sodium sulphate and calcium hypochlorite.

2. A composition comprising a substantially dry mixture containing calcium hypochlorite and anhydrous sodium sulphate in amount in excess of that necessary to react with all calcium present.

3. A composition comprising a substantially dry mixture containing anhydrous sodium sulphate, calcium hypochlorite and an acid compound.

In testimony whereof I affix my signature.

JAMES DOUGLAS MacMAHON.